US006553433B1

(12) United States Patent
Chang

(10) Patent No.: US 6,553,433 B1
(45) Date of Patent: Apr. 22, 2003

(54) IDE INTERFACE ADAPTER

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 0 days.

(21) Appl. No.: 09/547,858

(22) Filed: Apr. 12, 2000

(51) Int. Cl.$^7$ .......................... G06F 13/14; G06F 13/20
(52) U.S. Cl. ............................ 710/15; 710/18; 710/36; 710/38; 710/305; 710/316; 713/300; 714/22
(58) Field of Search ............................. 710/15, 18, 36, 710/38, 305, 316; 713/300; 714/22

(56) References Cited

U.S. PATENT DOCUMENTS

| | | | | | |
|---|---|---|---|---|---|
| 5,107,400 A | * | 4/1992 | Kobayashi | ............... | 200/50.01 |
| 5,309,155 A | * | 5/1994 | Hsien et al. | ................. | 315/360 |
| 5,805,921 A | * | 9/1998 | Kikinis et al. | ................. | 710/2 |
| 5,917,253 A | * | 6/1999 | Rusnack | ...................... | 307/29 |
| 6,139,333 A | * | 10/2000 | Green et al. | ........... | 379/413.04 |
| 6,256,719 B1 | * | 7/2001 | Frankel | ...................... | 710/305 |
| 6,272,533 B1 | * | 8/2001 | Browne | ...................... | 709/213 |

* cited by examiner

Primary Examiner—Jeffrey Gaffin
Assistant Examiner—Rehana Perveen
(74) Attorney, Agent, or Firm—Troxell Law Office PLLC

(57) ABSTRACT

An IDE interface adapter is constructed to include a box, and a circuit board mounted in the box, the circuit board including a first connector having 36 pins for receiving the 36-pin connector of an IDE interface device, a second connector having 50 pins for receiving the 50-pin connector of a mobile rack, a first power adapter, and a selector switch connected in series to the first power adapter, wherein the selector switch is shifted to alternatively connect the second connector to the first connector or the first power adapter, enabling the second connector to receive a working voltage from the first connector or the first power adapter.

12 Claims, 3 Drawing Sheets

IDE INTERFACE ADAPTER

BACKGROUND OF THE INVENTION

1. Field of the Invention

The present invention relates to an IDE interface adapter, and more particularly to such an IDE interface adapter adapted to connect a 36-pin interface device to a 50-pin mobile rack.

2. Description of Related Art

Computer technology has been well developed nowadays. A variety of computer hardware and software devices have been disclosed, and have appeared on the market. For high mobility, a variety of mobile racks have been developed for use with a personal computer. A mobile rack comprises an IDE interface connector. Most IDE interface connectors for mobile racks are of 50-pin design for connection with the motherboard connector of a computer. A mobile rack has a front hole for the insertion of, for example, a hard disk driver, and a circuit board on the inside for signal transmission control.

Due to dimensional limitation, these mobile racks cannot be directly used with a notebook computer. In order to connect a computer peripheral apparatus to a notebook computer, an adapter, for example, PCMCIA to IDE, USB to IDE, print port to IDE, 1394 (fire wire) to IDE, or SCSI to IDE adapter means shall be used. However, it is inconvenient to use a particular IDE interface adapter to connect a particular peripheral apparatus to a notebook computer.

Therefore, there is a strong demand to have an IDE interface adapter, which enables any of a variety of mobile racks to be electrically connected to a notebook computer. When designing an IDE interface adapter, power circuit arrangement must be carefully considered. Because a regular 36-pin connector can provide 5V working voltage only, which does not fit all kinds of mobiles racks, for example, a 3.5" hard disk driver requires 5V and 12V for normal working.

SUMMARY OF THE INVENTION

The present invention has been accomplished under the circumstances in view. According to one aspect of the present invention, the IDE interface adapter comprises a box, and a circuit board mounted in the box. The circuit board comprises a first connector having 36 pins for receiving the 36-pin connector of an IDE interface device, a second connector having 50 pins for receiving the 50-pin connector of a mobile rack, a first power adapter, and a selector switch connected in series to the first power adapter. The selector switch is shifted to alternatively connect the second connector to the first connector or the first power adapter, enabling the second connector to receive a working voltage from the first connector or the first power adapter.

According to another aspect of the present invention, the first power adapter provides two working voltages to said second connector.

According to still another aspect of the present invention, the circuit board further comprises a first indicator light, which is turned on when the second connector is electrically connected to the first connector or the first power adapter, and a second indicator light, which is turned on when the mobile rack which is connected to the second connector is in operation.

BRIEF DESCRIPTION OF THE DRAWINGS

The present invention can be more fully understood by reference to the following description and accompanying drawing, in which.

DETAILED DESCRIPTION OF THE PREFERRED EMBODIMENTS

Figure 1:
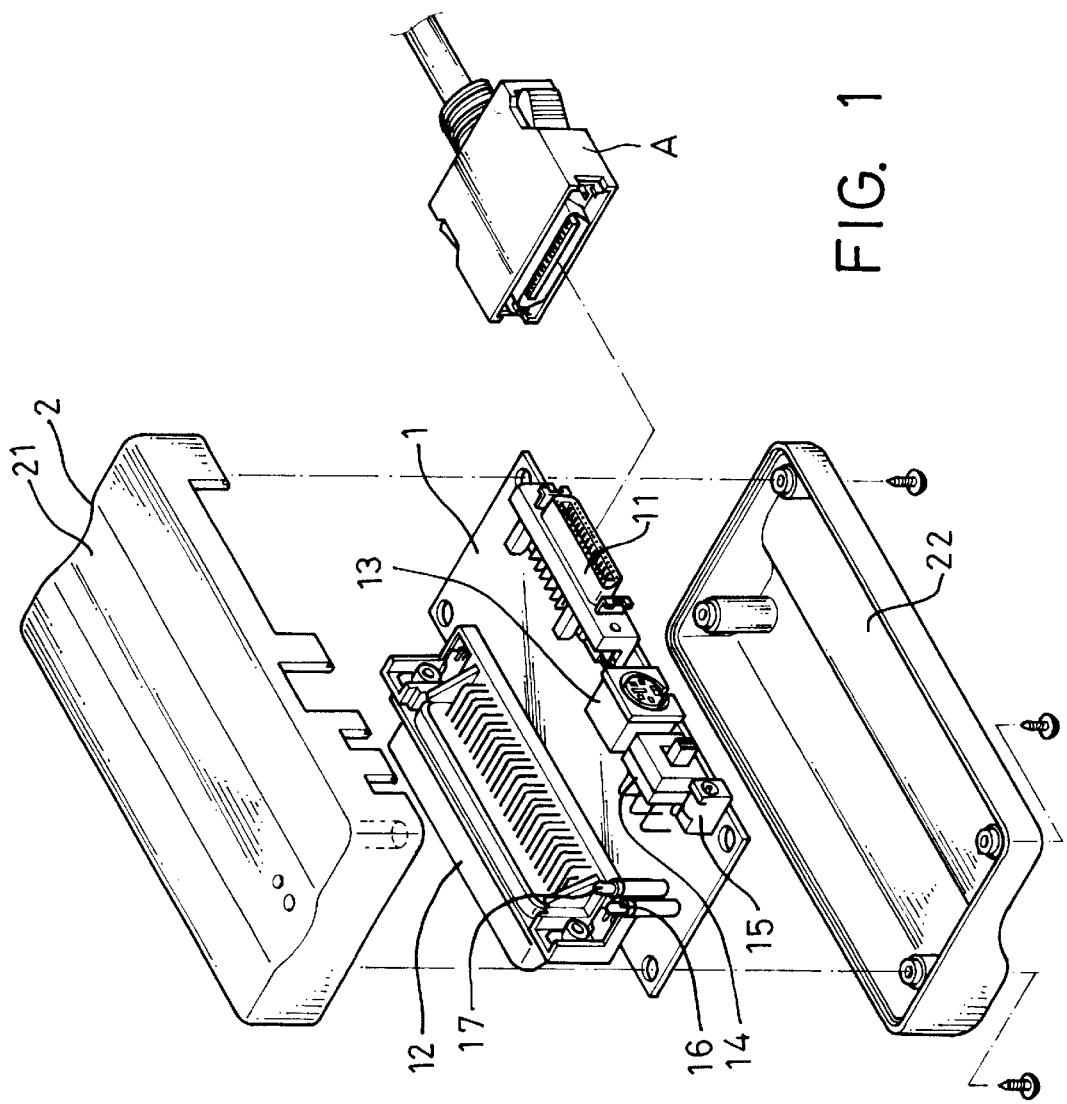
FIG. 1 is an exploded view of an IDE interface adapter according to he present invention.
Figure 2:
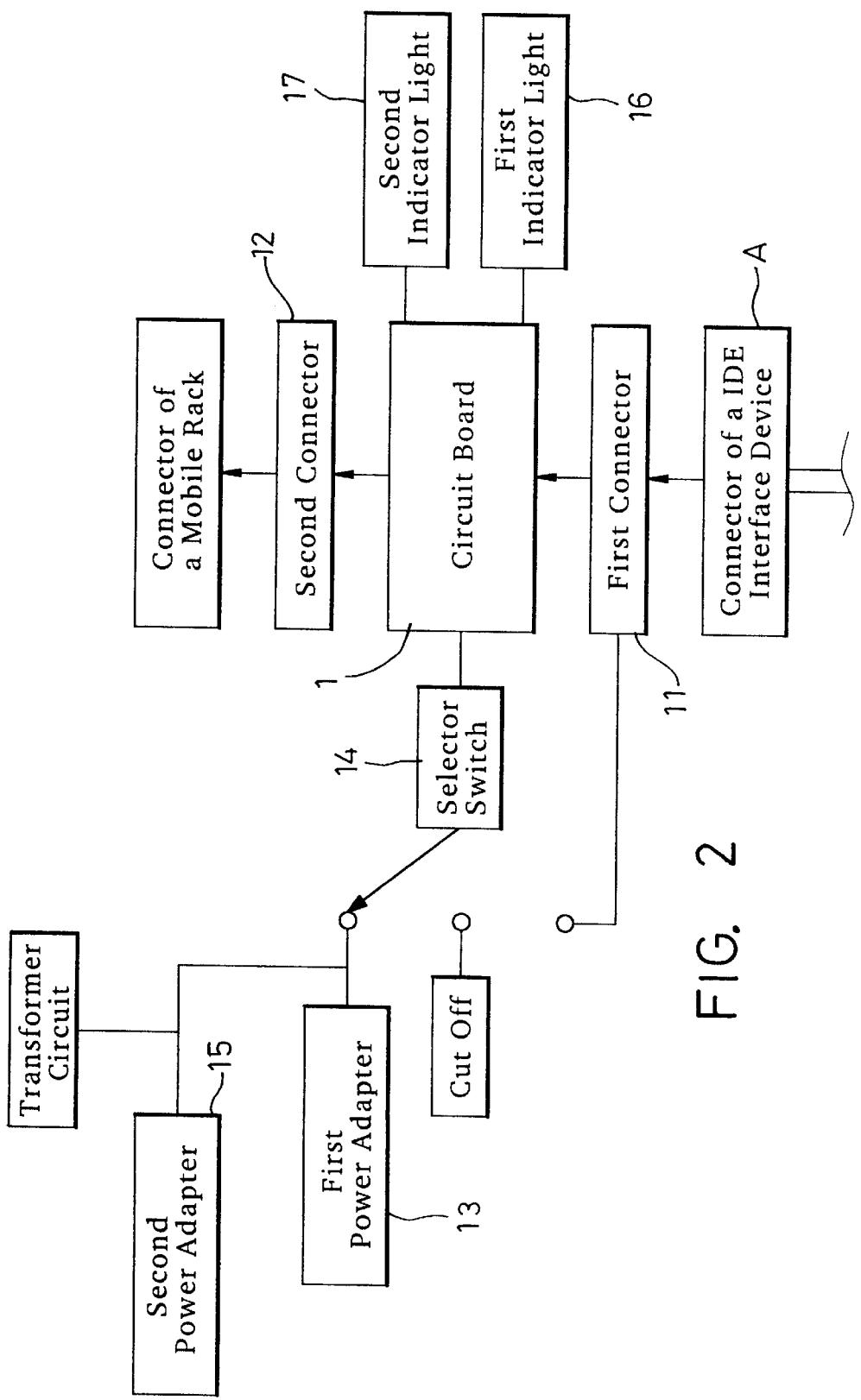
FIG. 2 is a block diagram showing the hardware architecture of the resent invention.
Figure 3:
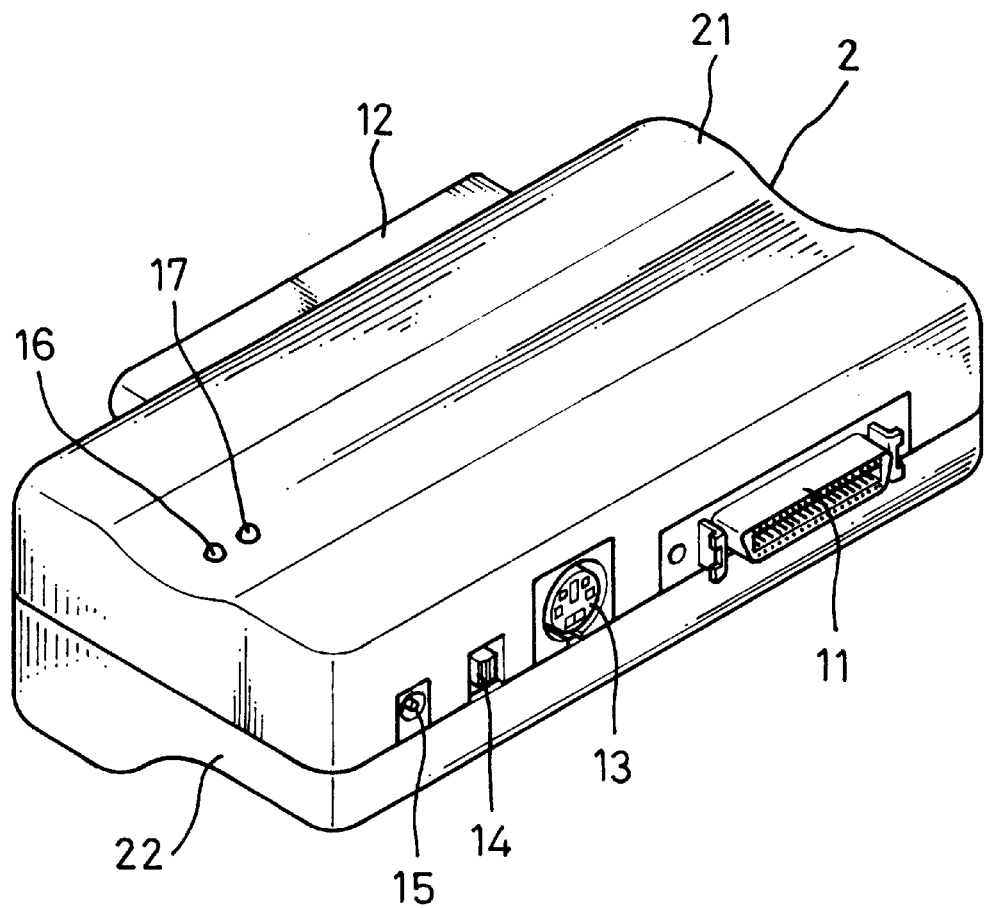
FIG. 3 is an elevational view of the IDE interface adapter according to the present invention.

Referring to FIGS. from 1 through 3, an IDE interface adapter in accordance with the present invention is generally comprised of a circuit board 1, and a box 2 holding the circuit board 1 on the inside.

The circuit board 1 comprises a first connector, namely, the 36-pin connector 11 disposed at one lateral side for receiving a PCMCIA to IDE, USB to IDE, Print port to IDE, 1394 to IDE, or SCSI to IDE 36-pin connector A, a second connector, namely, the 50-pin connector 12 disposed at an opposite lateral side for receiving the 50-pin connector of a mobile rack (not shown), a first power adapter 13, a selector switch 14, a second power adapter 15, a first indicator light 16, and a second indicator light 17. The selector switch 14 and the power first power adapter 13 are connected in series. The 50-pin connector 12 is controlled by the selector switch 14 to receive the necessary working voltage from the 36-pin connector 11 or the first power adapter 13. The first power adapter 13 provides two working voltages, for example, 5V and 12V. In one alternate form of the present invention, the first power adapter 13 is made to provide one single working voltage, for example, 5V. In another alternate form of the present invention, the first power adapter 13 is made to provide one single working voltage, for example, 12V, which is in turn converted by a transformer into 5V for the 50-pin connector 12.

The selector switch 14 has one end connected in series to the second power adapter 15. The second power adapter 15 is controlled by the selector switch 14 to provide one single working voltage, for example, 5V or 12V. The selector switch 14 can be selectively shifted to the right position to connect the 36-pin connector 11, the left position to connect the first power adapter 13 and the second power adapter 15, or the middle position to cut off the circuit. By means of controlling the selector switch 14, a working voltage is provided or not provided to the 50-pin connector 12.

Further, when the selector switch 14 is shifted to the left position to connect the first power adapter 13 and the second power adapter 15, or the right position to connect the 36-pin-connector 11, the first indicator light 16 of the circuit board 1 is turned on, indicating the presence of a working voltage to the 50-pin connector 12. When the mobile rack is reading or writing, the second indicator light 17 is turned on. Preferably, the first indicator light 16 is a green light, and the second indicator light 17 is a red light.

The box 2 is comprised of a top cover shell 21 and a bottom cover shell 22. The bottom cover shell 22 holds the circuit board 1. The top cover shell 21 covers on the bottom cover shell 22 to protect the circuit board 1, having a plurality of peripheral openings for receiving the component parts of the circuit board 1.

When in use, the connector A of an IDE interface device and the connector of a mobile rack are respectively connected to the 36-pin connector 11 and the 50-pin connector 12. Depending on the nature of the mobile rack (such as hard disk driver, CD-ROM player, DVD-ROM player, floppy disk driver, card reader, tape player, ZIP, MO, etc.), the 36-pin connector 11 or the first power adapter 13 and second power adapter 15 are controlled to provide the necessary working voltage to the mobile rack. If the mobile rack is a 3.5" hard disk driver or 5.25" CD-ROM player, the connector of the transformer is connected to the first power adapter 13, and the selector switch 14 is shifted to the left position to electrically connect the first power adapter 13 to the circuit board 1, and simultaneously to turn on the first indicator light 16, enabling the working voltage to be transmitted through the 50-pin connector 12 to the mobile rack. During the read write mode of the mobile rack, the second indicator light 17 is turned on. Alternatively, the second power adapter 15 can be controlled to provide a working voltage, for example, 5V or 12V to the 50-pin connector 12, or the second power adapter 15 can be controlled to provide a working voltage, for example, 12V, which is in turn converted into 5V for the 50-pin connector 12 through a transformer circuit.

By means of the application of the present invention, the 36-pin connector of the IDE interface device of a notebook computer can be connected to the 50-pin connector of a mobile rack, enabling the mobile rack to be operated under the control of the notebook computer. Further, by means of the arrangement of the first power adapter, the second power adapter and the selector switch, the loaded mobile rack can obtain a stable working voltage for normal working.

While only one embodiment of the present invention has been shown and described, it will be understood that various modifications and changes could be made thereunto without departing from the spirit and scope of the invention disclosed.

What is claimed is:

1. An IDE interface adapter comprising:
    a circuit board, said circuit board comprising a first connector having 36 pins for receiving a 36-pin connector of an IDE interface device, a second connector having 50 pins for receiving a 50-pin connector of a mobile rack, a first power adapter, a selector switch connected in series to said first power adapter and a second power adapter connected in series to said selector switch, and controlled by said selector switch to selectively provide a working voltage to said second connector; and
    a box holding said circuit board, said box comprising a bottom cover shell holding said circuit board, and a top cover shell covered on said bottom cover shell over said circuit board;
    wherein said selector switch is shifted to alternatively connect said second connector to said first connector or said first power adapter, enabling said second connector to receive a working voltage from said first connector or said first power adapter.

2. The IDE interface adapter of claim 1 wherein said first power adapter provides two working voltages to said second connector.

3. The IDE interface adapter of claim 1 wherein said first power adapter is selectively controlled by said selector switch to provide one single working voltage to said second connector.

4. The IDE interface adapter of claim 1 wherein said second power adapter is selectively controlled by said selector switch to provide one single working voltage to said second connector.

5. The IDE interface adapter of claim 1 wherein said first power adapter is selectively controlled by said selector switch to provide one single working voltage to a transformer circuit in said circuit board, enabling a provided working voltage to be converted to the desired level for said second connector by said transformer circuit.

6. The IDE interface adapter of claim 1 wherein said second power adapter is selectively controlled by said selector switch to provide one single working voltage to a transformer circuit in said circuit board, enabling a provided working voltage to be converted to the desired level for said second connector by said transformer circuit.

7. The IDE interface adapter of claim 1 wherein said selector switch is a three-position selector switch shifted between a first position in which said first connector is electrically connected to said second connector, a second position in which said first power adapter is electrically connected to said second connector, and a third position in which said second connector is electrically disconnected from said first connector and said first power adapter.

8. The IDE interface adapter of claim 1 wherein said circuit board further comprises a first indicator light, which is turned on when said second connector is electrically connected to said first connector or said first power adapter.

9. The IDE interface adapter of claim 1 wherein said circuit board further comprises a first indicator light, which is turned on when said second connector is electrically connected to said first connector of said second power adapter.

10. The IDE interface adapter of claim 1 wherein said circuit board further comprises a second indicator light, which is turned on when a mobile rack which is connected to said second connector is in operation.

11. The IDE interface adapter of claim 1 wherein said IDE interface device is selected from the group consisting of a PCMCIA to IDE, USB to IDE, Print port to IDE, 1394 (fire wire) to IDE, and SCSI to IDE interface device.

12. The IDE interface adapter of claim 1 wherein said mobile rack is selected from the group consisting of a hard disk driver, CD-ROM player, DVD-ROM player, floppy disk driver, card reader, tape player, ZIP, and MO.

* * * * *